DODGE & PERRY.
Harvester Rake.
2 Sheets—Sheet 1.
No. 71,718.
Patented Dec. 3, 1867.
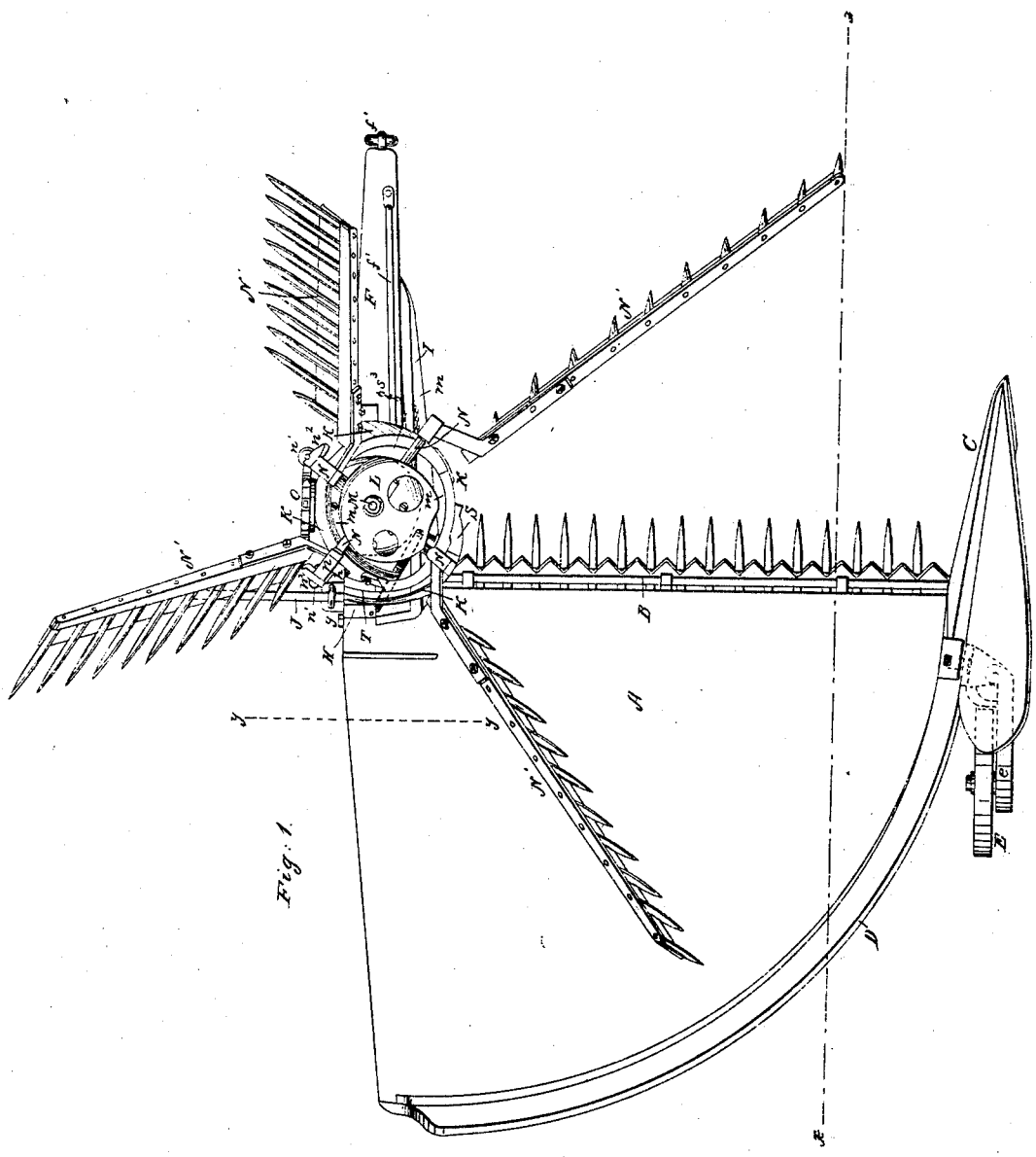

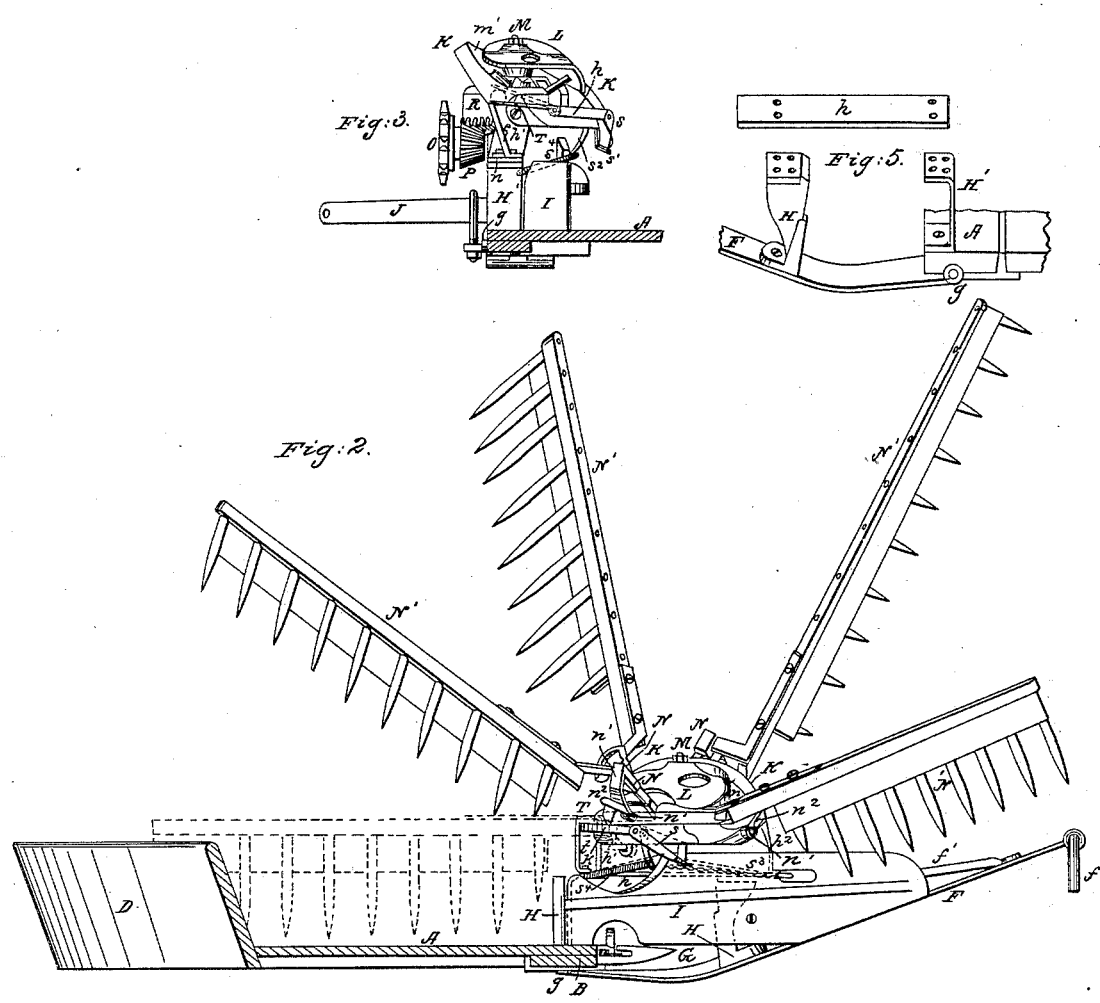

UNITED STATES PATENT OFFICE.

JOHN A. DODGE AND GEORGE PERRY, OF AUBURN, NEW YORK, ASSIGNORS TO JOHN A. DODGE.

IMPROVEMENT IN HARVESTER-RAKES.

Specification forming part of Letters Patent No. 71,718, dated December 3, 1867.

*To all whom it may concern:*

Be it known that we, JOHN A. DODGE and GEORGE PERRY, both of Auburn, in the county of Cayuga and State of New York, have invented certain new and useful Improvements in Harvester-Rakes, of which the following is a full, clear, and exact description, reference being had to the accompanying drawings, which make part of this specification, and in which—

Figure 1 represents a plan or top view of so much of a harvester embracing our improvements as is necessary to illustrate our invention. Fig. 2 represents a view, (partly in section at the line $x\,x$, Fig. 1,) in elevation, of the same, as seen from the divider side of the machine. Fig. 3 represents a view, (partly in section at the line $y\,y$ of Fig. 1,) in elevation, of the frame which supports the gearing which actuates and the guides which control the raking mechanism. Fig. 4 represents a view, in elevation, of the switch and its mechanism for changing the path of the rake, detached. Fig. 5 represents a view, in perspective, of the standards and cross-bar, upon which the raking mechanism is mounted and by which it is adjusted.

The improvement herein claimed consists in a novel mode of combining a series of independently-hinged rising-and-falling rake-arms continuously revolving around a vertical axis, whereby all the rake-arms may be used as beaters to press the standing grain back against the cutters, and, when severed, to deposit it upon the platform without raking it therefrom, while at the same time any one of the rake-arms or beaters may, at the will of the operator, be thrown into operation as a rake to discharge the gavel accumulated upon the platform.

Our invention is intended to be applied to a fully-organized harvester, and is shown in the accompanying drawings (which, however, represent only so much of the machine as is necessary to illustrate the invention herein claimed) as adapted for use in connection with a machine known as the "Dodge" harvester, which machine is shown and described in an application for Letters Patent of the United States filed simultaneously with this one by John A. Dodge. As, however, the adaptation of our invention to other machines involves only the skill of the constructor, it is obvious that it may readily be applied to many of the harvesters in general use.

In this instance an ordinary quadrant or sector shaped platform, A, is shown as attached in the ordinary way to a finger-beam, B, and having a divider, C, and fence or guard D at its outer edge. The divider end of the finger-beam is sustained by a wheel, E, supported in a swiveling arm, $e$, pivoted to a bracket capable of a vertical adjustment to regulate the height of that end of the platform above the ground. A drag-bar, F, is connected by a swiveling pin, $f$, to the main frame of the machine, (not shown in the drawing,) and hinged, at its rear end $g$ to the under side of a shoe, G, bolted securely to the finger-beam. The point of this shoe enters a vertical slot in a standard, H, on the drag-bar F, and can be adjusted higher or lower, or held in any desired position, for a purpose hereinafter explained. Another upright or standard, H', is mounted on the finger-beam just over the joint $g$ of the drag-bar. A cross-bar, $h$, bolted on the two standards H H', supports the raking mechanism. A rod, $f'$, connects the front standard to the drag-bar, and a compressor or guard-board, I, prevents the grain from becoming entangled with the above-described devices. An arm, J, projecting inward from the finger-beam, is suspended by a chain from the main frame, and thus sustains this end of the finger-beam. A continuous fixed cam-guide, K, is supported on the cross-bar $h$ by standards $h^1$ $h^2$, and a cam-plate, L, is secured firmly on a fixed spindle, M, in such manner as to leave a track, $m$, between the guide and cam-plate for the passage of the rake-arms N, which are pivoted to play vertically and independently of each other in a crown-wheel, R, which revolves on the spindle M, being driven by a bevel-wheel, P, on a longitudinal axis, carrying a sprocket-wheel, O, which may be driven by a chain from the axle of the main driving-wheel of the machine.

As before explained, the raking mechanism is mounted on a cross-bar, $h$, supported on the standards H H', the front standard H being on the drag-bar, while the rear one, H', is mounted on the finger-beam. The drag-bar is hinged to allow the point of the shoe G to be adjusted vertically in it to vary the inclination of the finger-beam, in order to keep the cutting apparatus horizontal. Consequently, as the front standard is movable with the drag-bar, while the rear one is fixed on the finger-beam, some adjustment must be made to compensate for this movement to prevent injury to the rake-frame. We effect this adjustment by boring a series of vertical holes in the standards H H' and bar $h$, (see Fig. 5,) and sliding the bar $h$ backward or forward, as required, to compensate for the movement of the shoe, and then screw it down again. The same result might be obtained by the use of slots and set-screws.

Each of the arms is constructed in the peculiar shape shown in the drawings, and carries a rake, $n^1$, bolted to it. These arms may be either of wrought or malleable iron. The cam-guide K is continuous, and consequently, were it used alone, each arm would in turn act as a rake and sweep off the grain at each stroke without regard to the size of the gavels. One of the principal objects of our invention is to regulate the size of the gavels. To do this we attach a track, $k$, to the outside of the cam, and pivot a switch, S, to its forward end, so as to allow it to play vertically, and limit its descent by a stop, $s^1$, constructed in this instance in the form of a hook attached to the cam-guide K. A crank-arm, $s^2$, projects downward from the pivot $s$ of the latch, and has a chain, $s^3$, connected to it, which is to be attached to a lever on the machine, to be operated by the hand or foot of the driver, as hereinafter explained. A spring, $s^4$, attached to the crank-arm keeps the switch open or resting against its stop when not closed by the pull on the chain.

A latch, T, is likewise pivoted (to play vertically) to the rear part of the track $k$, being supported by a standard, $t$.

Each rake-shank carries a curved arm, $n$, having a friction-roller, $n^1$, and a small spearhead or wedge, $n^2$, on its outer end. This wedge prevents the switch from striking the roller in the center, and thus stopping the rake. The rollers travel outside of the guide. When they strike the switch S they rise and travel on the track $k$, thus pressing the grain back against the cutters, but not sweeping it off the platform. When the switch is raised or closed (as shown in Fig. 2) the roller passes beneath it, the rake is held down upon the platform and rakes off the gavel. After discharging the gavel the rake is lifted by the cam-guide, and raises the latch T, (as shown in Fig 3,) escaping between the latch and its support $t$. When the switch S is open the rake rises and the friction-roller travels on its upper side, as well as that of the latch T, which then remains closed, and forms a track for the roller to run upon.

The operation of our invention will readily be understood from the foregoing description.

As the machine progresses the rakes revolve continuously, and successively descend into the standing grain, which they press back upon the cutters, and, when severed, deposit upon the platform. As the switch S remains open the rakes rise upon it and leave the gavel upon the platform. When a gavel of sufficient size has accumulated upon the platform the driver closes the switch S by drawing on the chain $s^3$. The friction-roller of the next rake that comes round passes below the switch, and holds the rake down upon the platform until the gavel is discharged, when it rises by lifting the latch T, as before explained. The driver releases the chain $s^3$ the moment the roller has passed the switch, which is immediately thrown open by its spring $s^4$. The next rake passes above the switch, and acts as a reel-arm simply, and the succeeding arms act in a similar manner until the switch is again closed.

By our invention we are enabled to carry rake-teeth on all the arms, and to use these arms at pleasure either as reels or rakes, and to regulate the size of the gavels without stopping to adjust the machine.

We have demonstrated the utility of our invention by careful experiment and practical working in the harvest-field.

What we claim herein, and desire to secure by Letters Patent, is—

1. The switch S, constructed, arranged, and operating as described.

2. The combination, with a continuously-rotating rake, of a vertically-moving latch, T, constructed, arranged, and operating as described.

3. The combination, as described, of the vertically-moving switch S with the stop $s^1$, for the purpose set forth.

4. The combination, substantially as described, with the continuous cam-guide, of the switch, arranged to play vertically to change the path of the rakes.

5. The combination, with a continuous cam-guide, K, of an outside track, $k$, a switch, S, and a latch, T, when both the latter are arranged to play vertically, for the purposes set forth.

6. The combination of the switch S, the crank-arm $s^2$, the cord $s^3$, the spring $s^4$, all constructed and arranged, as described, for joint operation.

7. The combination of the independently-hinged rising-and-falling rake-arms, continuously rotating round a common center, with the continuous cam-guide, the vertically-moving switch, and the latch, whereby either one of the arms can be used as a reel or as a rake, at the pleasure of the operator.

8. The rake-arms, having curved depending arms carrying friction-rollers, and operating as described.

9. The arrangement of the friction-rollers on the bent arms $n$ so that they always travel outside of the continuous cam-guide K.

10. The combination of the continuous cam and fixed cam-plate with the independently-hinged, continuously-rotating, rising-and-falling arms, carrying friction-rollers running outside of the cam-guide, and controlled by the switch, whereby the beaters are made to act as either a rake or a reel, as required.

11. The combination, substantially as described, with a continuous guide, a cam-plate, a switch, and a latch, of independent continuously-revolving rising-and-falling arms, a crown-wheel carrying the arms, and a bevel-wheel to rotate them.

12. The combination and arrangement, substantially as described, of the drag-bar, the adjustable shoe, and the finger-beam with the raking mechanism, whereby the rake can be mounted directly over the shoe without interfering with the adjustability of the shoe.

13. Mounting the rake on the adjustable bar $h$, as and for the purpose described.

14. The combination of a platform and hinged drag-bag, having a standard mounted on each, with raking mechanism mounted in a frame adjustable backward and forward on the standards, substantially in the manner and for the purpose described.

In testimony whereof we have hereunto subscribed our names.

JOHN A. DODGE.
GEORGE PERRY.

Witnesses:
   HORACE T. COOK,
   J. C. JEWETT.